US009272537B2

(12) United States Patent
Fallon et al.

(10) Patent No.: US 9,272,537 B2
(45) Date of Patent: Mar. 1, 2016

(54) PRINTING INFORMATION ON ELECTRONIC PAPER

(75) Inventors: Michael F. Fallon, Tiverton, RI (US); Myles J. Wilde, Charlestown, MA (US); Matthew Adiletta, Bolton, MA (US); Paul H. Dormitzer, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 763 days.

(21) Appl. No.: 13/555,727

(22) Filed: Jul. 23, 2012

(65) Prior Publication Data

US 2014/0022625 A1 Jan. 23, 2014

(51) Int. Cl.
*G02B 26/06* (2006.01)
*B41J 3/407* (2006.01)

(52) U.S. Cl.
CPC .................................... *B41J 3/4076* (2013.01)

(58) Field of Classification Search
CPC . G02F 1/167; G02F 2001/1678; G02F 1/172; G02F 2001/1672; G02B 26/026; B41J 3/407; B41J 3/4076
See application file for complete search history.

(56) References Cited

U.S. PATENT DOCUMENTS

2011/0298760 A1* 12/2011 Gila et al. .................... 345/179

* cited by examiner

*Primary Examiner* — Jennifer L. Doak
(74) *Attorney, Agent, or Firm* — International IP Law Group, P.L.L.C.

(57) ABSTRACT

A method and system for displaying information on an electronic paper (or "e-paper") is included herein. The method includes passing the e-paper through an e-paper printer. Additionally, the method includes changing a status of a pixel on the e-paper.

15 Claims, 8 Drawing Sheets

200

600

200

300

304

400

500

600

PRINTING INFORMATION ON ELECTRONIC PAPER

BACKGROUND

The methods and systems disclosed herein relate to displaying information from computer systems. More specifically, techniques for displaying information on electronic paper are disclosed.

One of the most common methods of displaying information via electronic devices is with a standard printer and paper. The printer receives data from a computer, and then uses ink to embed, or print, text and images onto a sheet of paper. The printed information is permanent and cannot be easily altered or disposed of outside of physically destroying the paper itself. Furthermore, the amount of ink that a printer can store is finite and must be replenished regularly. Thus, the use of a printer requires users to purchase and dispose of a large quantity of resources.

Another method that has gained wide acceptance in recent years is the use of an electronic reader or "e-reader". An e-reader functions by displaying text and images on a screen of limited size on the device. The information displayed by the screen is dictated by a document interpreter and renderer, which sends instruction to a driver to change the state of the pixels displayed on the screen. The electronics are fixed to the display screen, meaning that the device has a rigid form factor and cannot be resized or reshaped. Further, the electronics used to display the information add significant cost to the display. The e-readers are also incapable of displaying multiple pages of information simultaneously.

DETAILED DESCRIPTION

Figure 1:
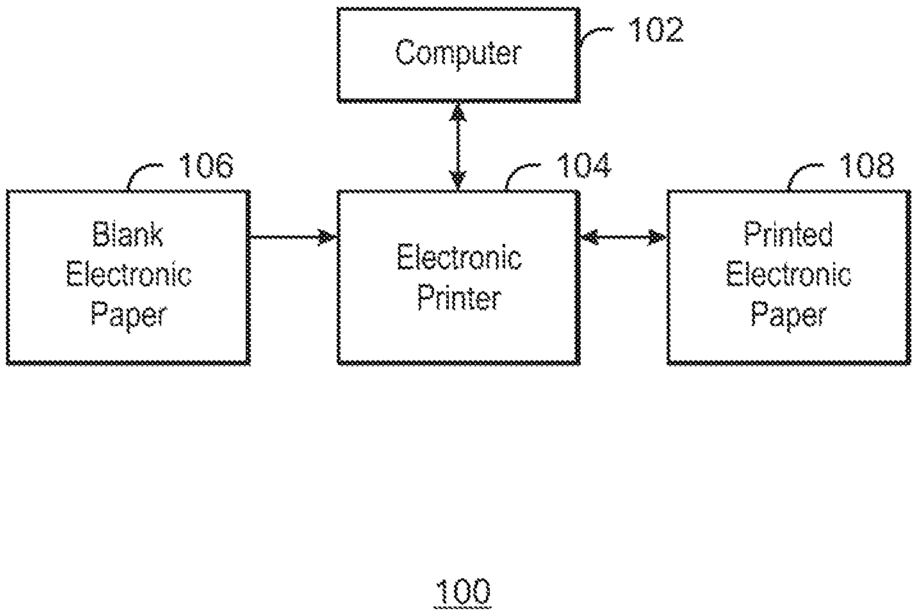
FIG. 1 is a block diagram of a computer system for displaying information on electronic paper (or "e-paper").

According to embodiments of the subject matter disclosed in this application, electronic paper (also known as "e-paper") is used as an alternative method for displaying information, in the form of text and images from a computer source. As used herein, e-paper describes a physical medium with a flexible form in which information can be displayed by altering a status of a number of pixels on it. The e-paper can be printed by being passed through a printer, which uses a print head to impose a field, such as a magnetic or electrical field, on the paper to cause pixels to transition from one stable state to another stable state. Unlike traditional paper, the display on e-paper can be reset by altering the status of the pixels, making it possible to erase information and re-use sheets of e-paper.

Although some embodiments have been described in reference to particular implementations, other implementations are possible according to some embodiments. Additionally, the arrangement and order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

FIG. 1 is a block diagram of a computing system for displaying information on a sheet of e-paper. The system 100 may include a computer 102 that functions as the source of the information to be printed. The computer 102 may be capable of storing information and transmitting instructions and may be, for example, a remotely located server, a desktop computer, laptop computer, tablet computer, or mobile phone, among others.

The computer 102 may be linked to an electronic printer (or "e-printer") 104, which may be capable of executing instructions provided by the computer 104. The e-printer 104 can accept a blank e-paper 106 and proceed to transfer (or "print") the information obtained from the computer onto the e-paper 106 for display. The e-printer 104 then provides the printed e-paper 108 as the output.

It is to be understood that the block diagram of FIG. 1 is not intended to indicate that the computing system 100 is to include all of the elements as shown in FIG. 1. Rather, the computing system 100 may include fewer or additional elements not illustrated in FIG. 1. Furthermore, any of the elements illustrated in FIG. 1 may not necessarily be as described. In one embodiment, the blank e-paper 106 to be accepted by e-printer 104 may not be blank, but may be a previously used sheet of e-paper 108, which can have the information displayed erased or altered.

Figure 2:
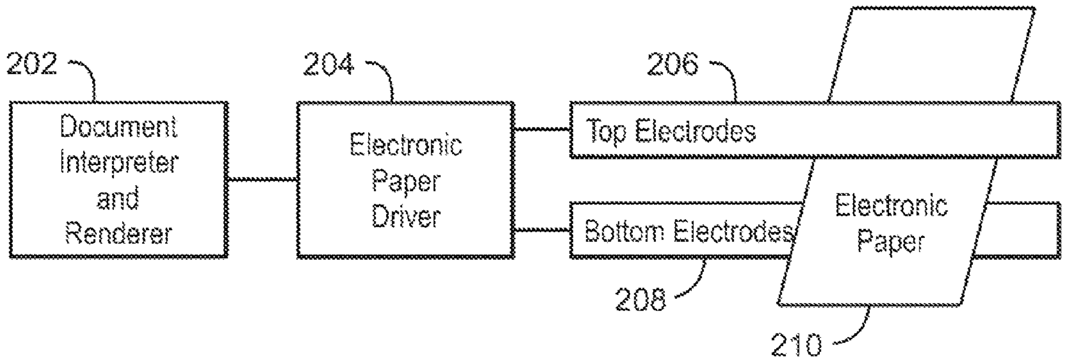
FIG. 2 is a schematic of a printing system for displaying information on e-paper.

FIG. 2 is a schematic of a printing system 200 for displaying information on e-paper, e.g., an e-printer. The printing system 200 may contain three components: a document interpreter and renderer 202, an e-paper driver 204, and top and bottom electrodes 206 and 208, respectively, configured to form an image on a sheet of e-paper 210.

The document interpreter and renderer 202 may be configured to obtain information from the computer 102 and process the information to create a bitmap. The bitmap is then transmitted to the e-paper driver 204, which may be connected to the document interpreter and renderer 202, directly or remotely. In one embodiment, the information may be processed in the computer 102 to create the bitmap, which can then be passed to the printing system 200.

The e-paper driver 204 may power top electrodes 206 and bottom electrodes 208 to form the image on the e-paper 210. The top electrodes 206 and bottom electrodes 208 may be arranged in linear arrays. Through external or internal means, the e-paper 210 can be moved between the top electrodes 206 and bottom electrodes 208, to write the displayed information. The top electrodes 206 and bottom electrodes 208 may be replaced by other types of printheads that serve to alter the display of the e-paper 210.

Figure 3A:
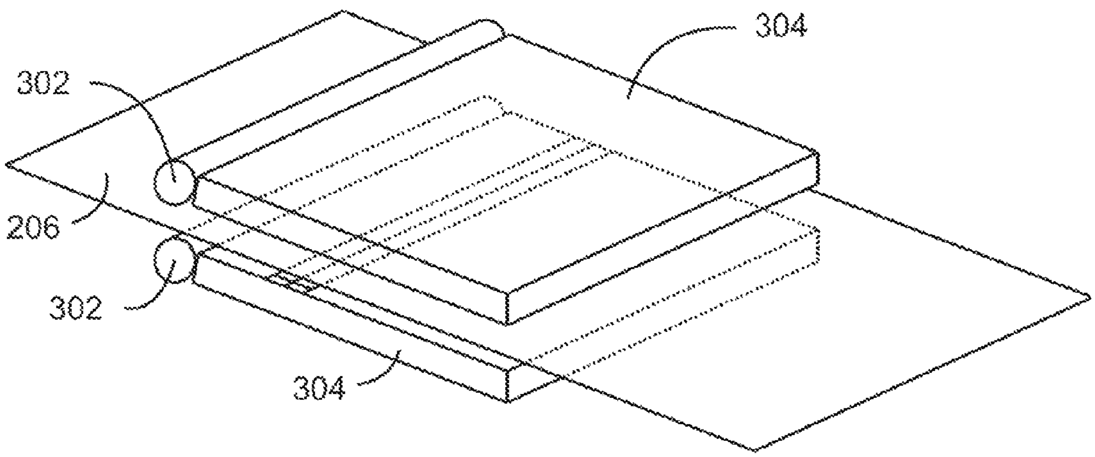
FIG. 3A is a drawing of a print system showing the mechanical interactions.

FIG. 3A is a drawing of a print system 300, e.g., the e-printer of FIG. 2, showing the mechanical interactions. The print system 300 may utilize a mechanism such as a set of automated rollers 302 to move the e-paper 210 between the printheads 304. The print system 300 may also utilize a second set of automated rollers (not shown) to move the e-paper 206 through the system.

Figure 3B:
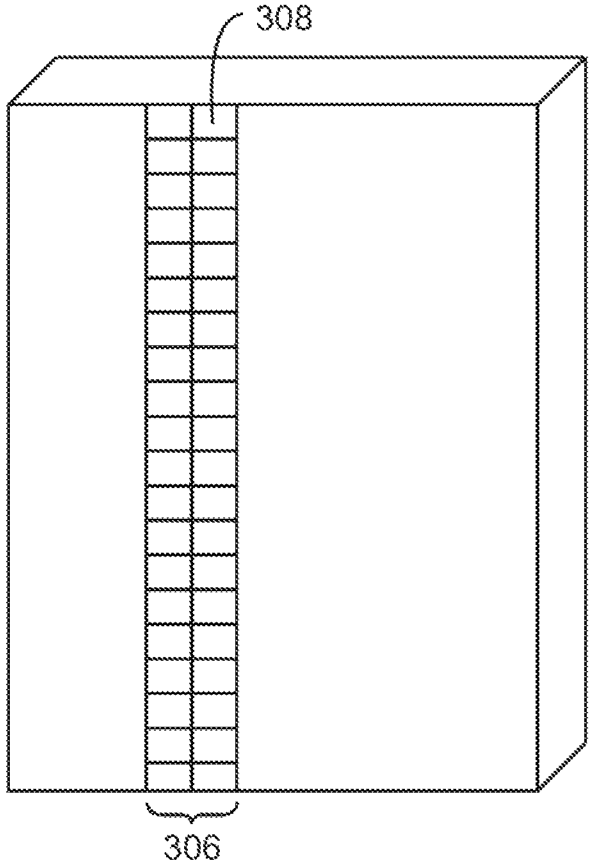
FIG. 3B is a perspective view of a printhead used in the print system.

FIG. 3B is a perspective view of a printhead used in the print system 300. The printhead 304 may contain a linear array 306 of electrodes 308. The electrodes 308 may deliver an electrical charge to the e-paper 206 to change the status of its pixels. In other embodiments, the printhead 304 may not feature a linear array 306 of electrodes 308, but rather other means of interacting with the e-paper 210. In another embodiment, the printhead 304 utilizes an array of electromagnets.

Figure 4:
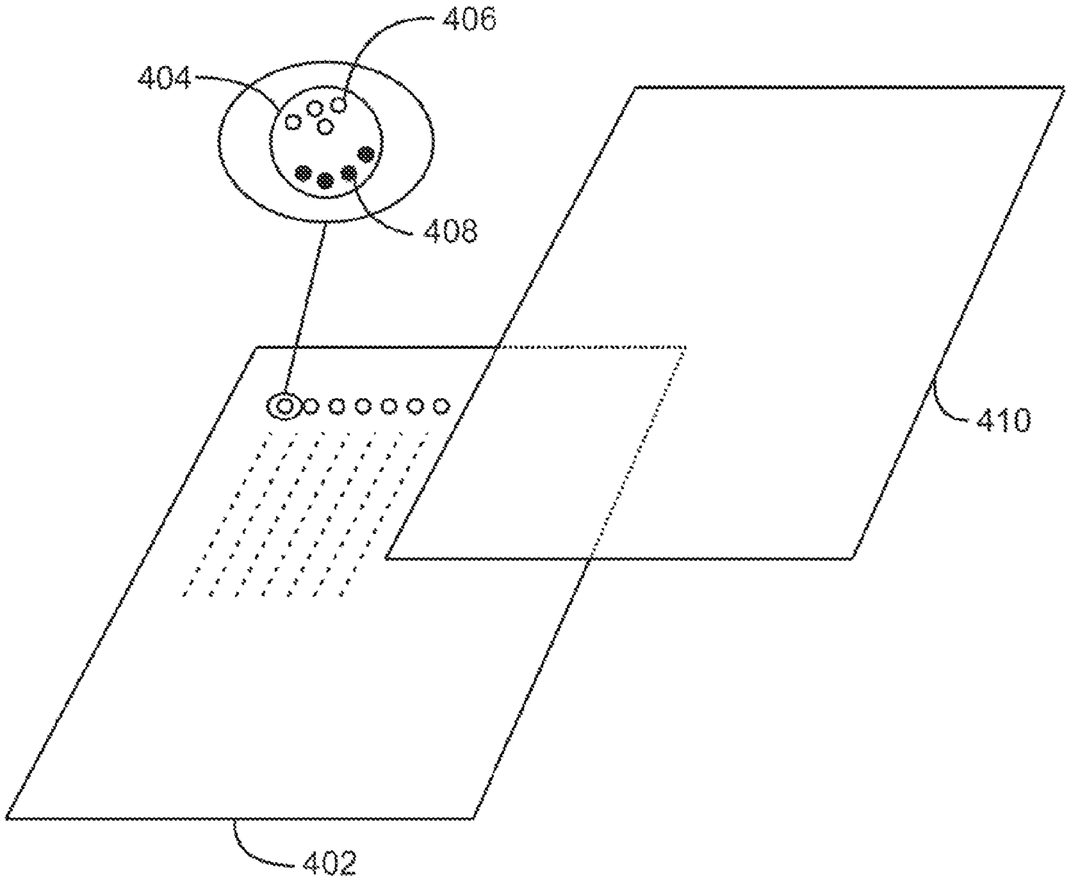
FIG. 4 is a drawing of a sheet of e-paper.

FIG. 4 is a drawing of a sheet of e-paper. The e-paper 400 includes a substrate 402, which may be flexible, allowing it to be rolled up. Depending on the application, the substrate 402 may also be transparent, translucent, or opaque. In one embodiment, the substrate 402 may be biaxially-oriented polyethylene terephthalate (commonly known as "Mylar"), which would give it high tensile strength and dimensional stability. Other possible embodiments of the substrate may include flashspun high-density polyethylene fibers or polypropylene. Materials such as glass, fabric, and traditional paper may also be considered.

The substrate 402 may contain within itself a number of microscopic capsules 404, each of which may carry two or more visible states. These capsules 404 may be acted upon by an e-printer 104 to alter their associated visible states. The capsules 404 may contain white dye particles 406 and black (or colored) dye particles 408 suspended in a liquid such as an oil. The microscopic capsules 404 may be as small as 100 microns wide, in some embodiments.

The microscopic capsules 404 may be produced through a variety of microencapsulation methods, some of which may be available commercially. One embodiment of a method may be to form an oil-in-water emulsion, in which the oil is a solution containing white titanium dioxide particles and carbon black particles. Within the emulsion, the oil may take the form of microscopic droplets. A coating material, such as a borate or a natural gum, can be added into the emulsion, where it may interact with the oil droplets by forming a wall or membrane around them.

Another embodiment of microencapsulation may include a nozzle that can spray a liquid solution containing the white and black dye particles. The nozzle may be rotating or vibrating so that as the liquid is dispersed through the air, it breaks into droplets, which can interact with a coating material to form the microcapsules.

It is to be understood that the aforementioned methods describe only a few ways that the microscopic capsules 404 may be produced. Other embodiments, including capsules that utilize solid (as opposed to liquid) cores, may be possible.

The capsules 404 may be embedded onto the substrate 402 through a variety of means. They may be sprayed, brushed, or coated onto the substrate 402 along with an adhesive.

The white dye particles 406 may have a first charge, e.g. positive, while the black (or colored) dye particles 408 may have an opposite charge, e.g., negative. In this embodiment, an applied electrical charge forces the positively and, negatively charged particles may migrate to opposing sides of the capsule 404, resulting in a pixel on the e-paper 400 displaying either black or white.

In some embodiments, a second substrate 410 is disposed over the first substrate 402 to help contain the capsules 404. The second substrate may be composed of the same material as the first substrate 402, or a different material altogether. The second substrate 410 is substantially transparent to allow the capsules to be viewed, although contact transparency may suffice. Embodiments of the second substrate 402 may include clear polypropylene or polycarbonate.

It is to be understood that the drawing of FIG. 4 does not indicate the only possible embodiment of e-paper 400. The capsules 404 are not limited to using charged particles. For example, instead of colored dye particles, the capsules 404 may each contain a sphere whose surface contains two or more different colors. When acted upon by an external force, the sphere may rotate and re-orient itself so that a particular color is displayed. The external force applied may include an electrical charge or a magnetic field.

In yet another embodiment, an electro-wetting process is used in which the capsules 404 are replaced with electrodes, each of which contains an oil/water interface whose shape can be controlled by an applied voltage. When no voltage is present, the colored oil forms a film over the electrode, resulting in a dark or colored pixel display. If a voltage is applied, the water acts upon the oil and shifts it aside, exposing the reflective surface of the electrode to light. This may result in a translucent or white pixel display.

Figure 5:
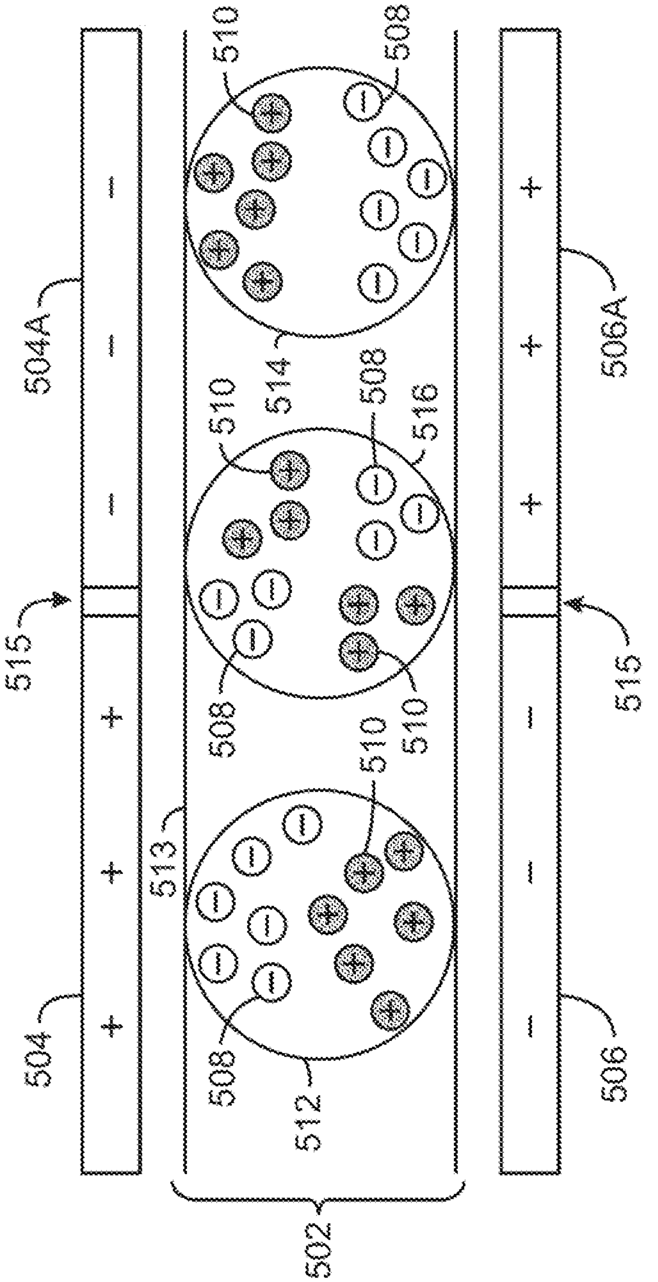
FIG. 5 is a schematic diagram illustrating the changing of a status of a grouping of pixels on a sheet of e-paper.

FIG. 5 is a schematic diagram illustrating the changing of the status of a grouping of pixels on a sheet of e-paper. In the schematic 500, an electrophoretic e-paper 502 is acted upon by a number of upper electrodes 504 and lower electrodes 506. The electrophoretic e-paper 502 may contain a number of microscopic capsules filled with two or more different colors of dye particles. In some embodiments, the capsules may feature white titanium dioxide (titania) particles 508 along with dark-colored particles, such as carbon black particles 510, in a hydrocarbon oil. The particles 508 and 510 may be chemically treated to have opposing electrical charges. For example, the titania particles 508 may have a negative surface charge, while the carbon black particles 510 may have a positive surface charge.

An opposite electrical charge may be imposed on opposing electrodes 504 and 506, changing the visual status of the pixels. For example, in a leftmost capsule 512, the white negatively charged particles 508 will migrate toward the positively charged upper electrode 504, while the darker positively charged particles 510 will migrate toward the negatively charged lower electrode 506. The outcome of this is a white pixel, as viewed from a first side 513.

In the schematic 500, another upper electrode 504A is negatively charged, and an opposing bottom electrode 506A is positively charged. As a result, the dark positively-charged particles 510 may migrate upward in a second capsule 514, showing a dark pixel display, as viewed from the first side 513. A layer of insulation 515 may be located between individual electrode regions 504 and 504A and 506 and 506A, allowing different charges to be imposed.

The middle capsule 516 in this embodiment is acted upon by two opposing sets of electrodes. In this scenario, the white 508 and dark particles 510 do not uniformly migrate in a particular direction. However, as the capsules 512, 514, and 516 may be much smaller in size than the area of the electrodes acting upon them, e.g., the pixel size, indefinite capsules 516 may not be noticeable.

Figure 6:
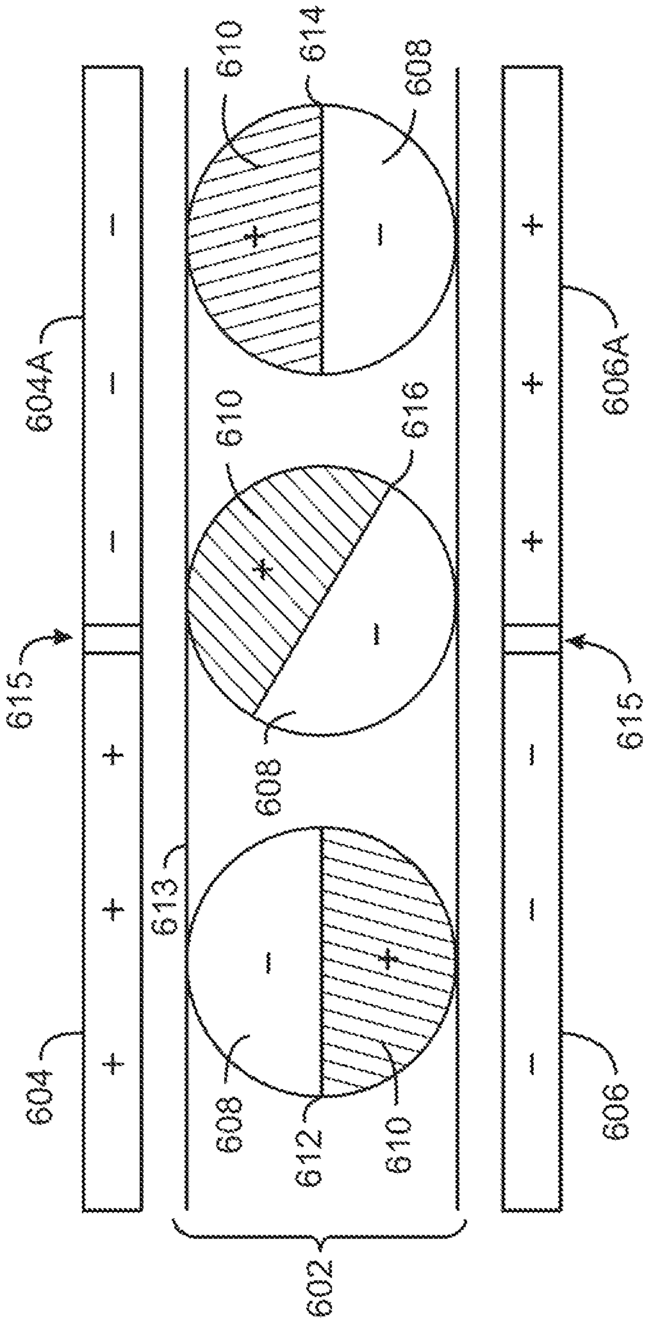
FIG. 6 is a schematic diagram illustrating the changing of a status of a grouping of pixels on another sheet of e-paper.

FIG. 6 is a schematic diagram illustrating the changing of the status of a grouping of pixels on another sheet e-paper. In this schematic 600, an electrostatic e-paper 602 is acted upon by a number of upper electrodes 604 and lower electrodes 606.

The electrostatic e-paper 602 may contain a number of microscopic capsules, each of which contains within itself a sphere with two or more contrasting colors on its surface. In this embodiment, the sphere features a white hemisphere 608 and a dark hemisphere 610, each carrying an opposite electrical charge. For example, the white hemisphere 608 may have a negative surface charge, while the dark hemisphere 610 may have a positive surface charge.

An opposite electrical charge may be imposed on opposite electrodes 604 and 606, changing the visual display status of the pixels. For example, in a leftmost capsule 612, the sphere will orient itself so that the negatively charged white hemisphere 608 faces the positively charged upper electrode 604, while the positively charged dark hemisphere 610 faces the negatively charged lower electrode 606. The outcome of this is a white pixel, as viewed from a first surface 613.

In schematic 600, another upper electrode 604A is negatively charged, and an opposing bottom electrode 606A is positively charged. As a result, the positively-charged dark hemisphere 610 in a second capsule 614 faces upward, showing a dark pixel display, as viewed from the first surface 613. As discussed with respect to FIG. 5, a layer of insulation 615 may be located between individual electrode regions 604 and 604A and 606 and 606A, allowing different charges to be imposed.

The middle capsule 616 in this embodiment is acted upon by two opposing sets of electrodes. In this scenario, the sphere does not reach a stable orientation, resulting in a display that may be in a random orientation between the different colors. However, as the capsules 612, 614, and 616 may be much smaller in size than the area of the electrodes acting upon them, e.g., the pixel size, indefinitely oriented capsules 616 may not be noticeable.

In another embodiment, the capsules 612, 614, and 616 are not electrically charged, but magnetized. In this case, the electrodes 206 and 208 would be replaced with magnetic coils or plates that would impose magnetic fields onto the capsules 612, 614, and 616. This would cause the capsules 612, 614, and 616 to re-orient themselves to display the appropriate color.

Figure 7:
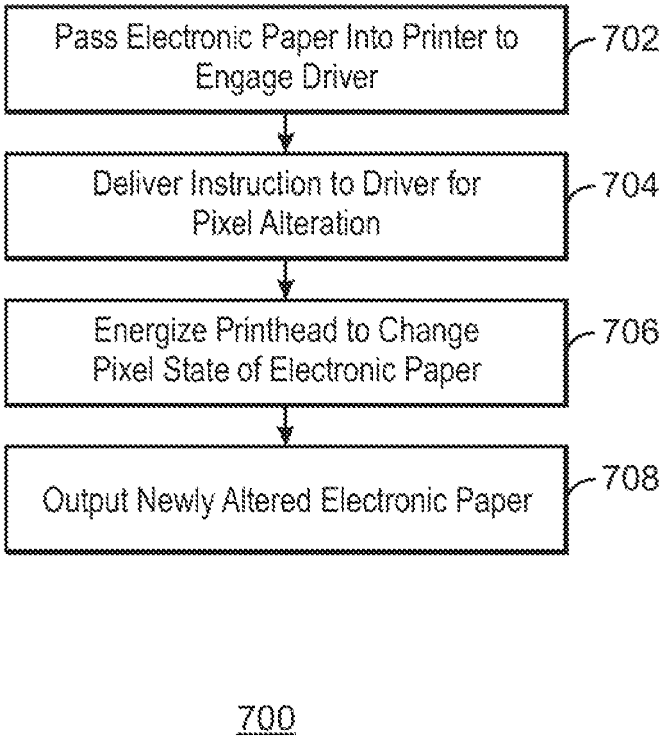
FIG. 7 is a process flow diagram illustrating a method for displaying information on e-paper.

FIG. 7 is a process flow diagram illustrating a method for displaying information on e-paper. Referring also to FIG. 1, the method 700 may be implemented with a computing system 100 composed of a computer 102 and an e-paper printer 104. FIG. 2 provides one embodiment of a printing system 200 that makes use of a document interpreter and renderer 202, an e-paper driver 204, and a printhead 304 made up of top electrodes 206 and bottom electrodes 208. In another embodiment, the interpretation and rendering function may be performed by an attached computer.

At block 702, e-paper is passed into the printer to engage the driver. This process may be performed by a set of automated rollers. The e-paper engages the driver so that it is aligned with the printhead. In some embodiments, the top and bottom electrodes are arranged in linear rows perpendicular to the direction vector of the e-paper.

At block 704, instructions are delivered to the driver for pixel alteration. The computer may serve as the source of the instructions for the printing process. The instructions may take the form of a bitmap composed by the document interpreter and renderer, and would define the output of text and images that would be displayed onto the e-paper. In other embodiments, the instructions may take the form of a document description language, such as the postscript language, which is rendered into a bitmap within the printer.

At block 706, the printhead is energized to change the pixel state of the e-paper. For example, the top electrodes and the bottom electrodes may be electrically charged, causing the appropriate dye particles in the e-paper to migrate accordingly to form the image outlined by the bitmap. In another embodiment, the electrodes may cause colored spheres in the e-paper to rotate and orient themselves so that the correct colors are exposed. If the embodiment utilizes electromagnetic coils or plates in lieu of the top electrodes and bottom electrodes, the printhead could induce magnetic fields to re-orient the spheres.

At block 708, the altered e-paper is released as output. The automated rollers may be used, in conjunction with a second optional set, to expel the newly altered e-paper from the printer. If, at any point in time following this stage, the information on the e-paper becomes unnecessary or requires disposal, the e-paper can be put back into the e-printer to be re-used. This would restart the method at block 702.

The process flow diagram of FIG. 7 is not intended to indicate that the blocks 702 to 708 are the executed in any particular order, or that blocks 702 to 708 are included in every case. Further, any number of additional operations or processes may be included within the method 700, depending on the specific application.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method for displaying information on an electronic paper ("e-paper"), comprising:

passing the e-paper through an e-paper printer, wherein an electrode is located in the e-paper, and wherein the electrode comprises an interface to be controlled; and changing a status of a pixel on the e-paper, wherein a first configuration of the interface is to expose a reflective surface of the electrode and a second configuration of the interface is to form a film over the electrode, and wherein the first configuration and the second configuration act to change of the status of the pixel.

2. The method of claim 1, further comprising changing a status of a plurality of pixels.

3. The method of claim 2, further comprising displaying information on the e-paper.

4. The method of claim 1, further comprising resetting the status of the pixel.

5. The method of claim 1, further comprising imposing an electric field across the e-paper to change the status of the pixel.

6. The method of claim 1, further comprising imposing a magnetic field across the e-paper to change the status of the pixel.

7. The method of claim 1, comprising applying a voltage to the electrode to implement the first configuration and removing the voltage from the electrode to implement the second configuration.

8. The method of claim 1, wherein the interface comprises an oil-water interface and wherein the shape of the oil-water interface is to be controlled by a voltage applied to the electrode.

9. The method of claim 1, wherein the interface comprises an oil-water interface, and wherein the water shifts the oil aside to expose the surface of the electrode when a voltage is applied.

10. The method of claim 1, wherein the interface comprises an oil-water interface, and wherein the oil forms the film to cover a surface of the electrode when a voltage is removed.

11. The method of claim 1, wherein the exposed surface of the electrode comprises a reflective surface to display a white pixel on the e-paper.

12. The method of claim 1, wherein the film formed over the electrode comprises an oil of an oil-water interface to display a dark pixel or a colored pixel on the e-paper.

13. The method of claim 1, wherein the e-paper comprises a multi-colored sphere to be controlled.

14. The method of claim 1, applying a force to a multi-colored sphere located in the e-paper.

15. The method of claim 1, wherein an external force applied to a multi-colored sphere located in the e-paper is to rotate the sphere to display a specific color, and wherein the specific color is to change the status of the pixel.

* * * * *